US005296934A

United States Patent [19]

Ohtsuki

[11] Patent Number: 5,296,934

[45] Date of Patent: Mar. 22, 1994

[54] FACSIMILE TERMINAL CONCENTRATION EQUIPMENT AND REMOTE OPERATION CONTROL SYSTEM THEREFOR

[75] Inventor: Junichi Ohtsuki, Kanagawa, Japan

[73] Assignee: Mitsubishi Denki Kabushiki Kaisha, Tokyo, Japan

[21] Appl. No.: 783,990

[22] Filed: Oct. 29, 1991

[30] Foreign Application Priority Data

Oct. 30, 1990 [JP] Japan .................................. 2-293285

[51] Int. Cl.[5] ............................................. H04N 1/00

[52] U.S. Cl. ...................................... 58/403; 358/400

[58] Field of Search ................ 358/400, 402, 403, 407

[56] References Cited

U.S. PATENT DOCUMENTS

| | | | |
|---|---|---|---|
| 4,918,772 | 4/1990 | Duehren et al. | 358/403 |
| 4,994,926 | 2/1991 | Gordon et al. | 358/400 |
| 5,170,266 | 12/1992 | Marsh et al. | 358/403 |
| 5,172,245 | 12/1992 | Kita et al. | 358/403 |

*Primary Examiner*—Stephen Brinich

*Attorney, Agent, or Firm*—Wolf, Greenfield & Sacks

[57] ABSTRACT

A facsimile terminal concentration equipment equipped with a downline loading section (31) for transferring various commands, load modules, files and others from a facsimile mail equipment (2) and an upline loading section (32) for transferring various commands, load modules, files and others to the facsimile mail equipment (2). Remote operation control from the facsimile mail equipment (2) to the facsimile terminal concentration equipment (30) is effected from the facsimile mail equipment (2) by using the downline loading section (31) and the upline loading section (32). The facsimile main equipment (2) uses the downline loading section (31) so as to transfer the various commands, load modules, files and others to the facsimile terminal concentration equipment (3). Further, the upline loading section acts as transferring the various commands, load modules, files and others from the facsimile terminal concentration equipment (30) to the facsimile mail equipment (2).

14 Claims, 24 Drawing Sheets

FXD HANDLER
35 MESSAGE INTERFACE (MIF)
MONITOR
IN
OUT
CPAD
P-VC
OPERATION MANAGEMENT
FDD HANDLER
STW HANDLER
PNL
L1 FAX DRIVER
T·30 HANDLER
38a~38n G3FAX INTERFACE (FIF)
MONITOR
FAX
PKT
PRC
KEY-COM
C BUS HANDLER
PKTIF
PKT
PRC + ANS
C BUS HANDLER
39 PACKET INTERFACE (PIF)
MONITOR
PRC
C BUS HANDLER
KEY-COM
40 C BUS
LAPB DRIVER
LAPB HANDLER
LCC

DOWNLINE LOADING PROCESS

UPLINE LOADING PROCESS

LOGON/LOGOFF PROCESS

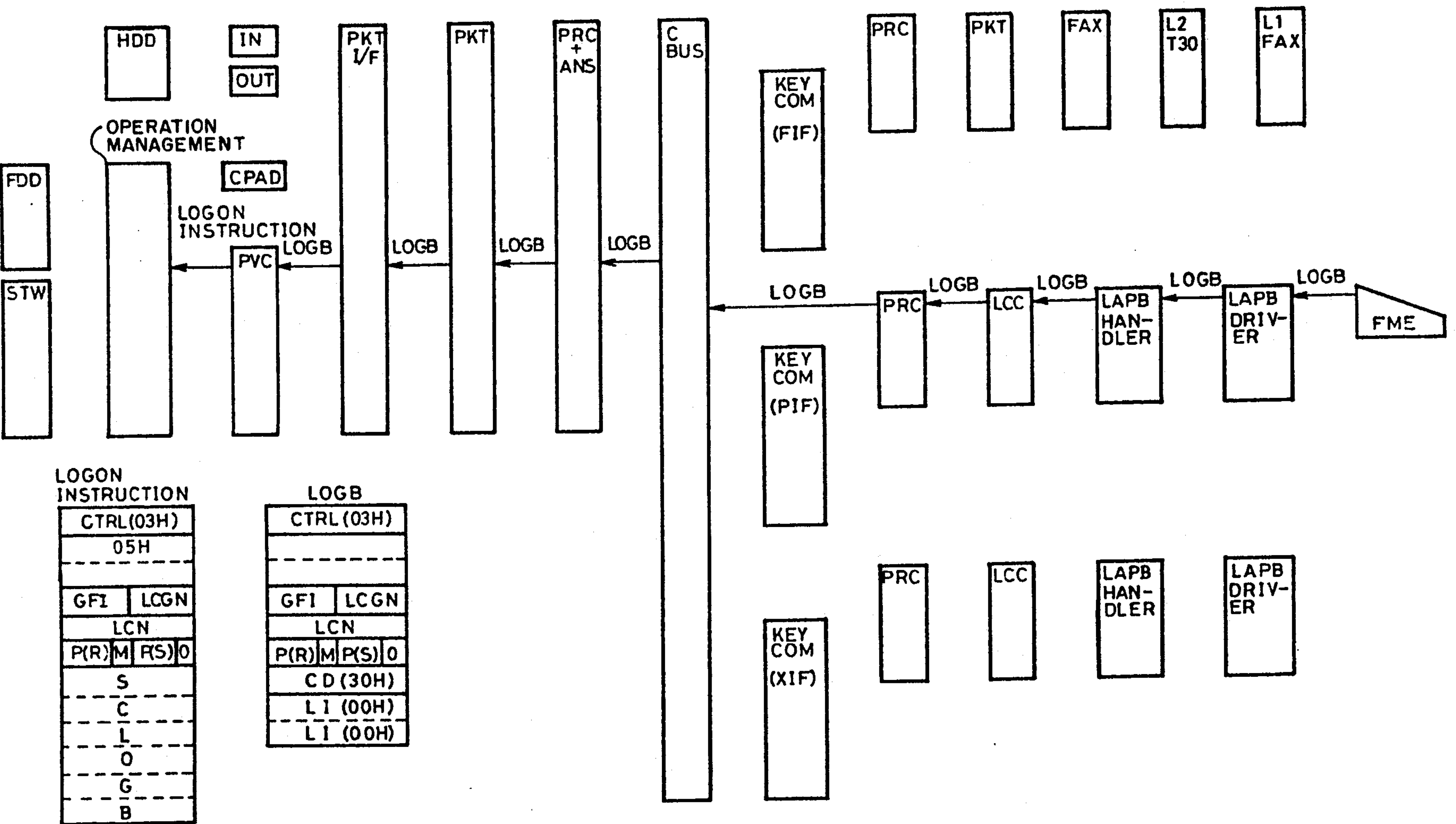
FIG. 10 LOGON REQUEST FROM FME <610>
HDD
IN
OUT
PKT I/F
PKT
PRC + ANS
C BUS
KEY COM (FIF)
KEY COM (PIF)
KEY COM (XIF)
PRC
PKT
FAX
L2 T30
L1 FAX
OPERATION MANAGEMENT
CPAD
FDD
STW
LOGON INSTRUCTION
PVC
LOGB
PRC
LCC
LAPB HAN-DLER
LAPB DRIV-ER
FME
LOGON INSTRUCTION
CTRL(03H)
05H
GFI
LCGN
LCN
P(R) M P(S) 0
S
C
L
O
G
B
LOGB
CTRL(03H)
GFI
LCGN
LCN
P(R) M P(S) 0
CD(30H)
LI (00H)
LI (00H)

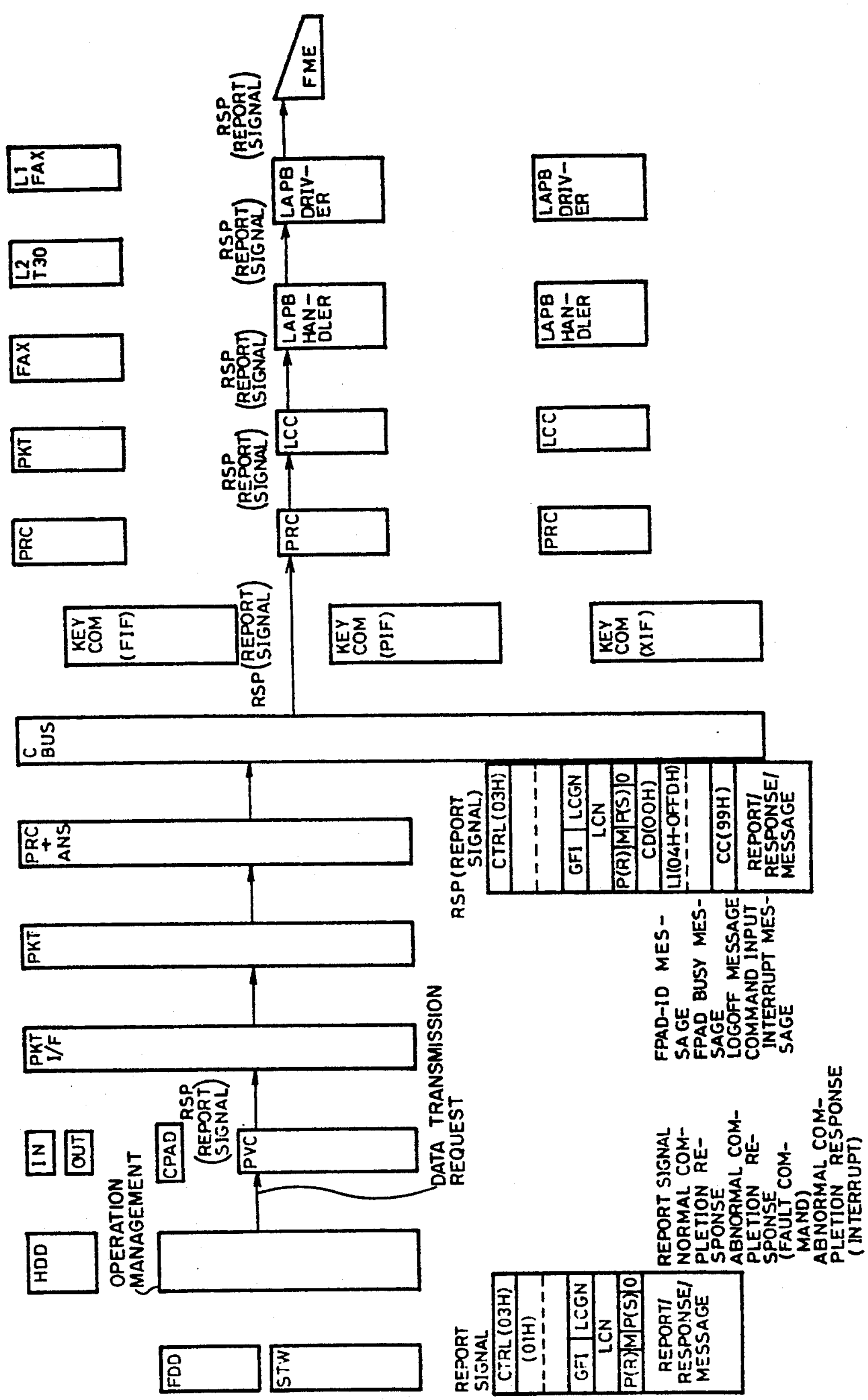
FIG. 11 SUBMITTING REPORT TO FME <611>
HDD
IN
OUT
CPAD
FDD
STW
OPERATION MANAGEMENT
DATA TRANSMISSION REQUEST
PVC
RSP (REPORT SIGNAL)
PKT I/F
PKT
PRC + ANS
C BUS
KEY COM (FIF)
KEY COM (PIF)
KEY COM (XIF)
PRC
PKT
FAX
L2 T30
L1 FAX
LCC
LAPB HAN-DLER
LAPB DRIV-ER
FME
REPORT SIGNAL
CTRL (03H)
(01H)
GFI
LCGN
LCN
P(R)
M
P(S)
0
REPORT/ RESPONSE/ MESSAGE
REPORT SIGNAL NORMAL COM-PLETION RE-SPONSE ABNORMAL COM-PLETION RE-SPONSE (FAULT COM-MAND) ABNORMAL COM-PLETION RESPONSE (INTERRUPT)
RSP (REPORT SIGNAL)
CD (00H)
LI (04H-OFFDH)
CC (99H)
FPAD-ID MES-SAGE FPAD BUSY MES-SAGE LOGOFF MESSAGE COMMAND INPUT INTERRUPT MES-SAGE

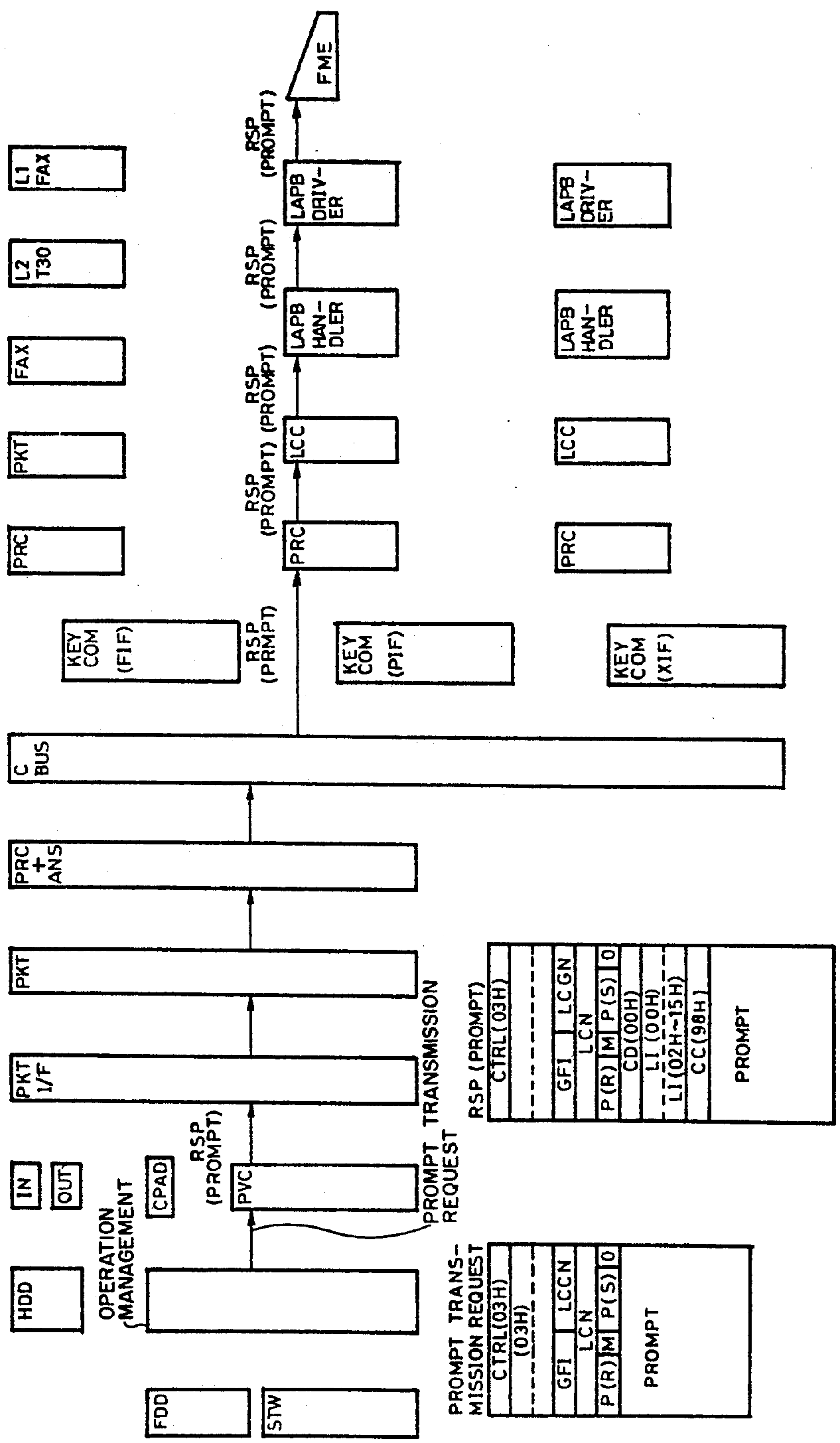
FIG. 12 TRANSMISSION OF PROMPT TO FME <612>

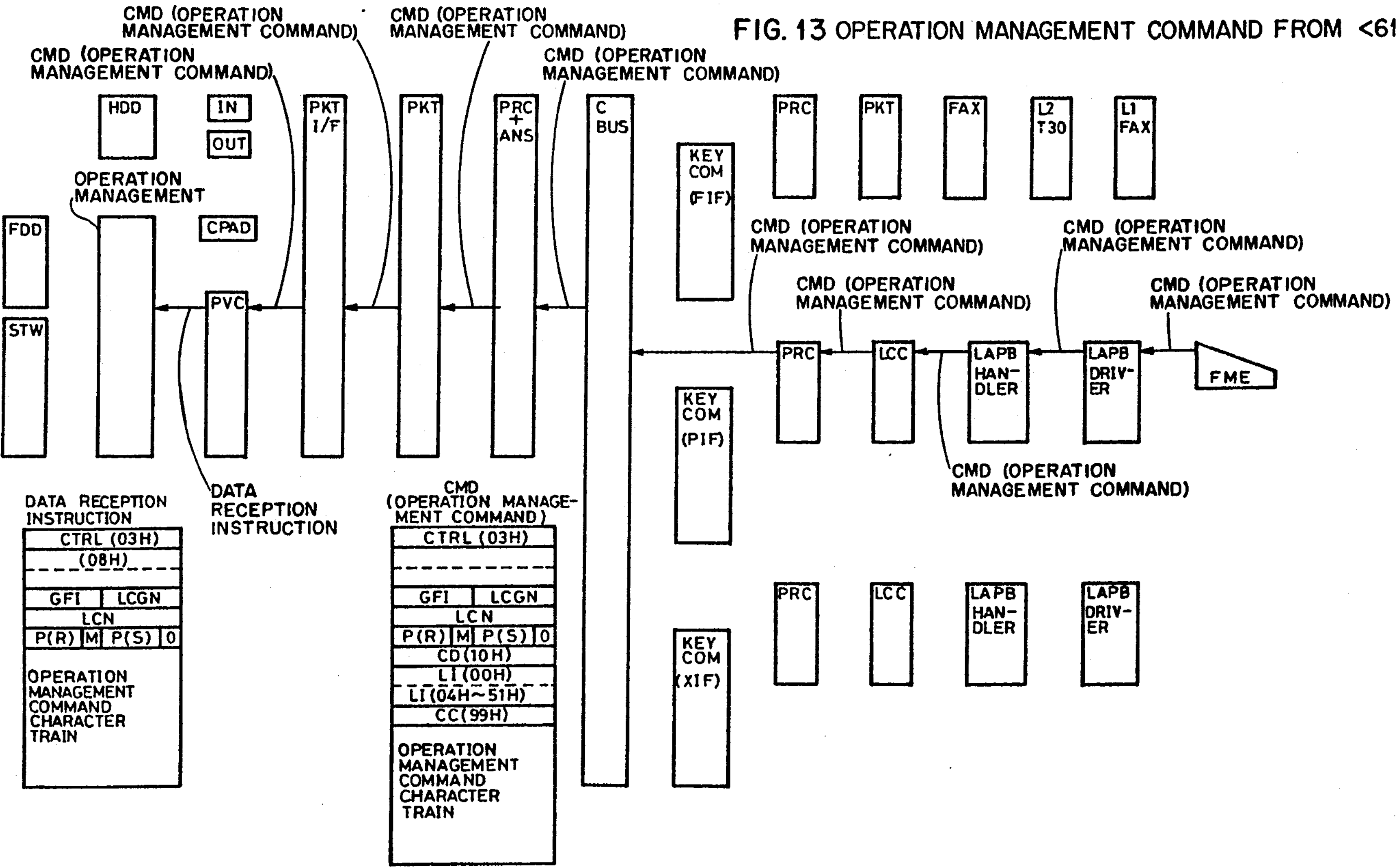
FIG. 13 OPERATION MANAGEMENT COMMAND FROM <613>

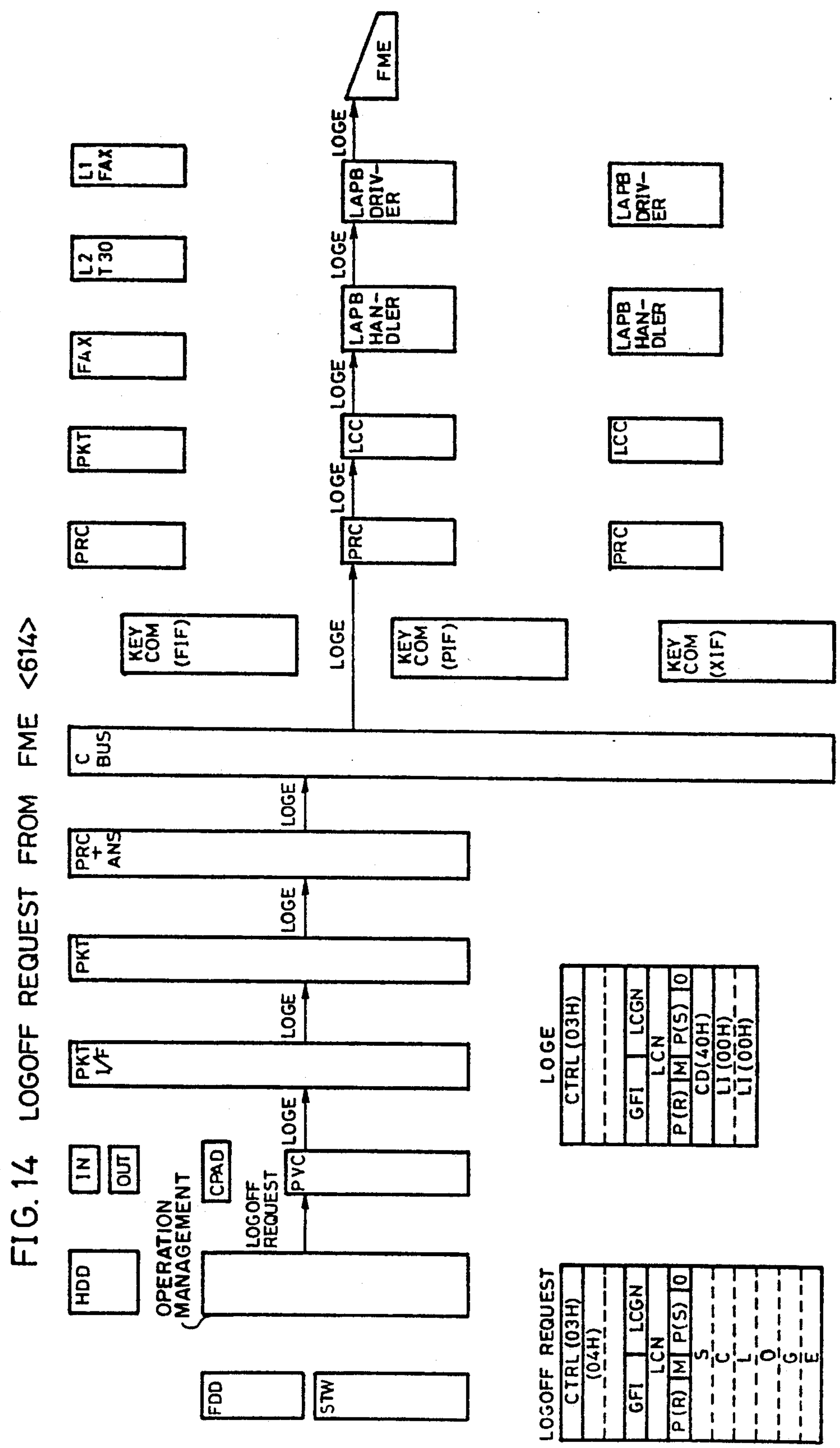
FIG. 14 LOGOFF REQUEST FROM FME <614>
HDD
IN
OUT
CPAD
FDD
STW
OPERATION MANAGEMENT
LOGOFF REQUEST
PVC
LOGE
PKT I/F
PKT
PRC + ANS
C BUS
KEY COM (FIF)
KEY COM (PIF)
KEY COM (XIF)
PRC
PKT
FAX
L2 T30
L1 FAX
LCC
LAPB HAN-DLER
LAPB DRIV-ER
FME
LOGE
CTRL (03H)
GFI
LCGN
LCN
P(R)
M
P(S)
0
CD(40H)
LI (00H)
LI (00H)
LOGOFF REQUEST
CTRL (03H)
(04H)
GFI
LCGN
LCN
P(R)
M
P(S)
0
S
C
L
O
G
E

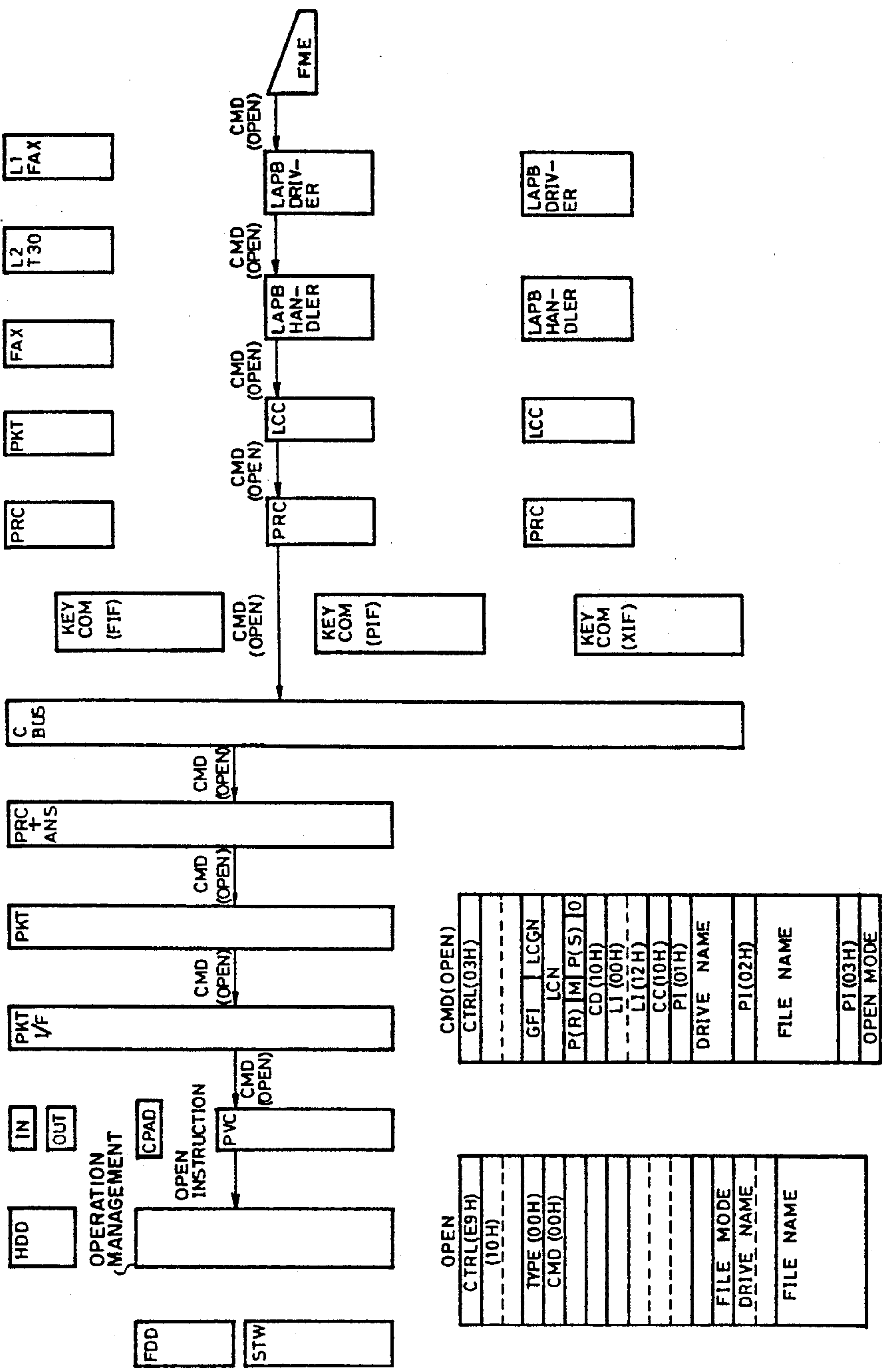
FIG. 15 FILE OPEN <616>

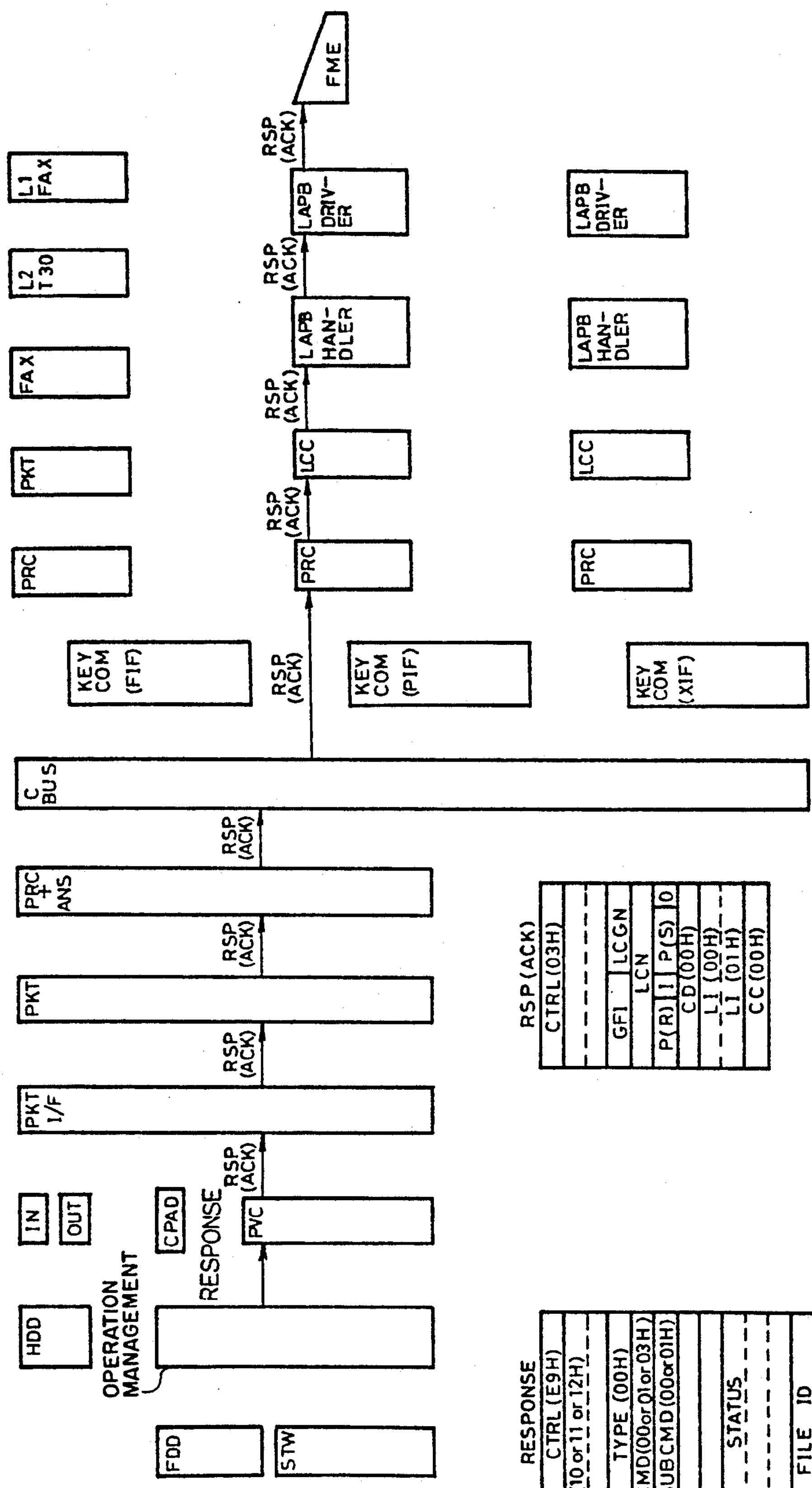

FIG. 16 OPEN.CLOSE. WRITE SUCCESS <617>
HDD
IN
OUT
CPAD
OPERATION MANAGEMENT
RESPONSE
PVC
RSP (ACK)
PKT I/F
RSP (ACK)
PKT
RSP (ACK)
PRC + ANS
RSP (ACK)
C BUS
RSP (ACK)
KEY COM (FIF)
KEY COM (PIF)
KEY COM (XIF)
PRC
RSP (ACK)
LCC
RSP (ACK)
LAPB HAN-DLER
RSP (ACK)
LAPB DRIV-ER
RSP (ACK)
FME
PRC
PKT
FAX
L2 T30
L1 FAX
PRC
LCC
LAPB HAN-DLER
LAPB DRIV-ER
FDD
STW
RESPONSE
CTRL (E9H)
(10 or 11 or 12H)
TYPE (00H)
CMD(00or01or03H)
SUBCMD(00or01H)
STATUS
FILE ID
FILE MODE
RSP (ACK)
CTRL (03H)
GFI
LCGN
LCN
P(R)
1
P(S)
0
CD (00H)
LI (00H)
LI (01H)
CC (00H)

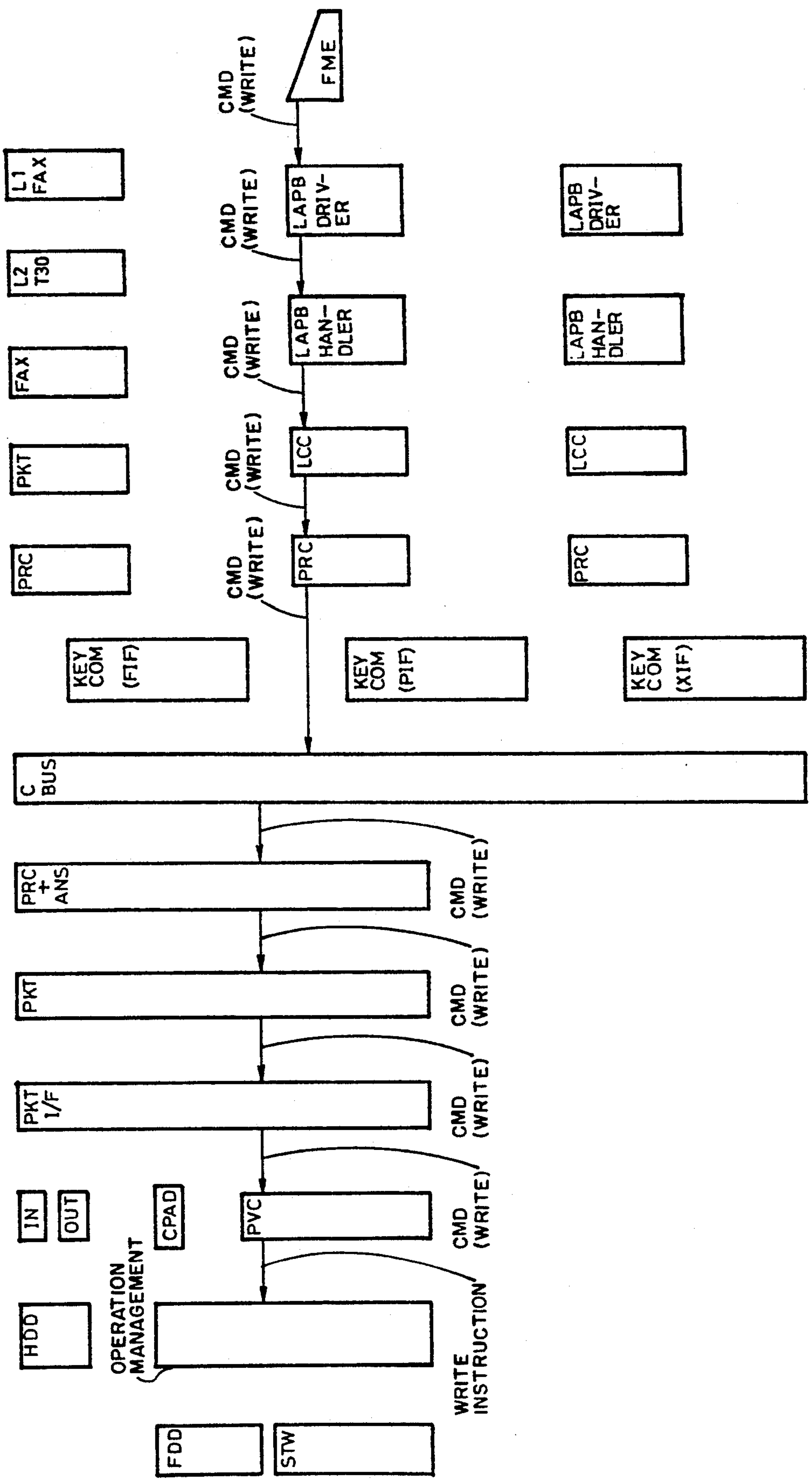
FIG. 17(a) FILE WRITE <619>
FME
CMD (WRITE)
L1 FAX
L2 T30
FAX
PKT
PRC
LAPB DRIVER
LAPB HANDLER
LCC
PRC
KEY COM (FIF)
KEY COM (PIF)
KEY COM (XIF)
C BUS
PRC + ANS
PKT
PKT I/F
IN
OUT
CPAD
PVC
HDD
OPERATION MANAGEMENT
WRITE INSTRUCTION
FDD
STW

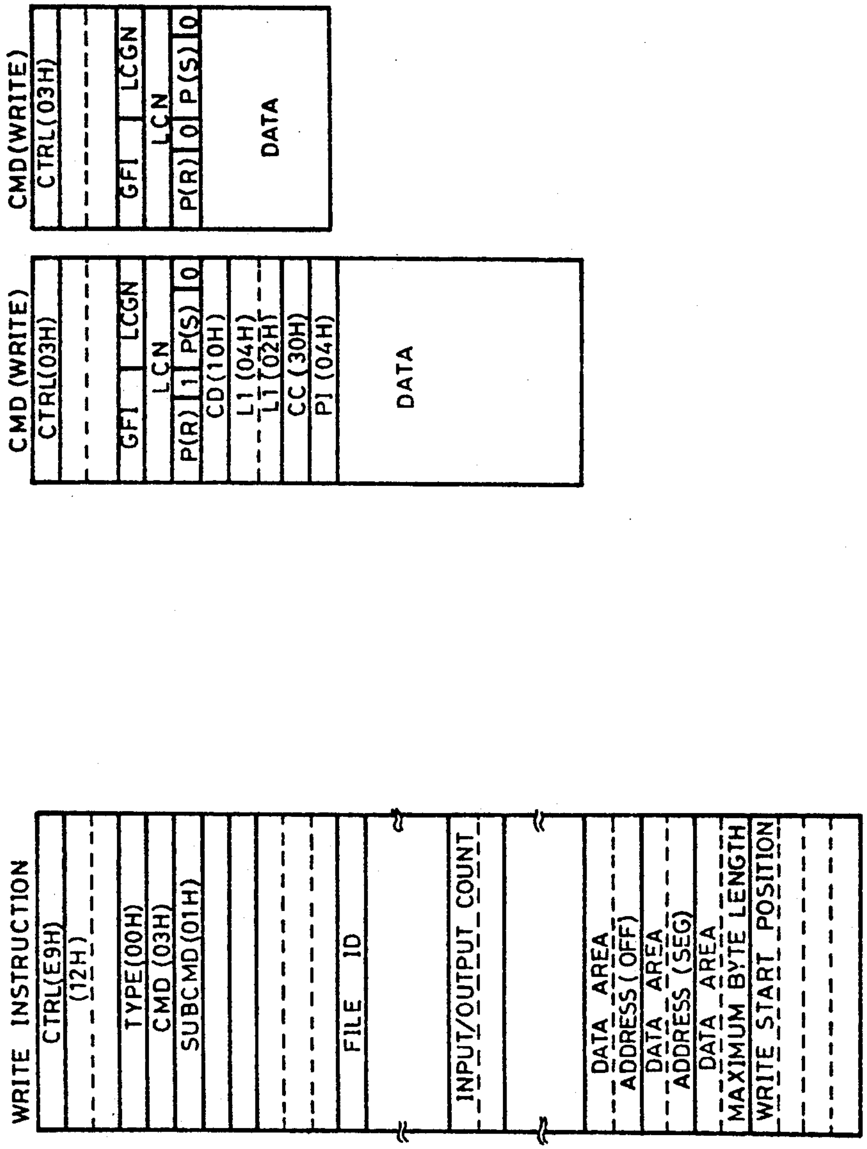
FIG.17(b) FILE WRITE <619>

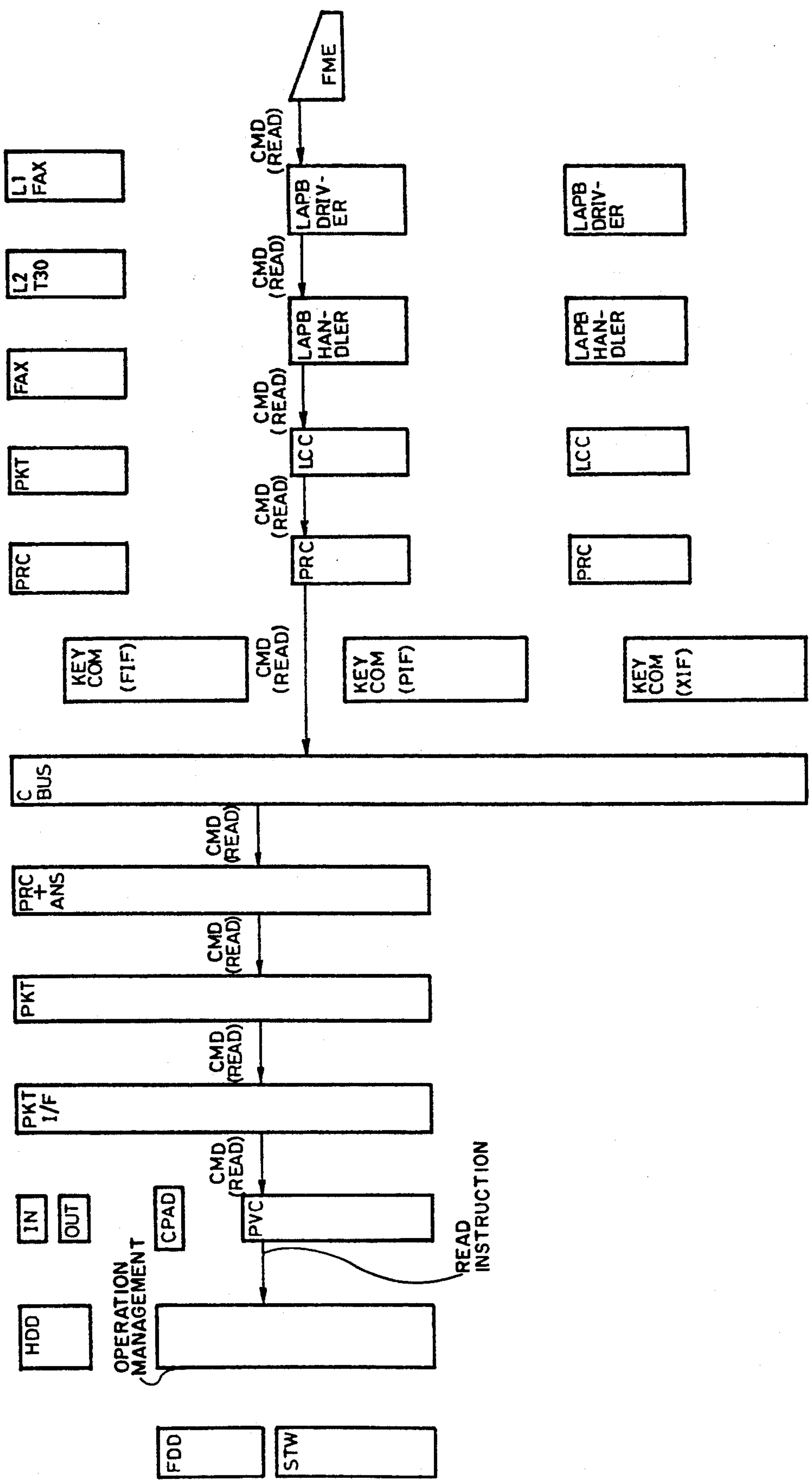
FIG.18(a) FILE READ <620>

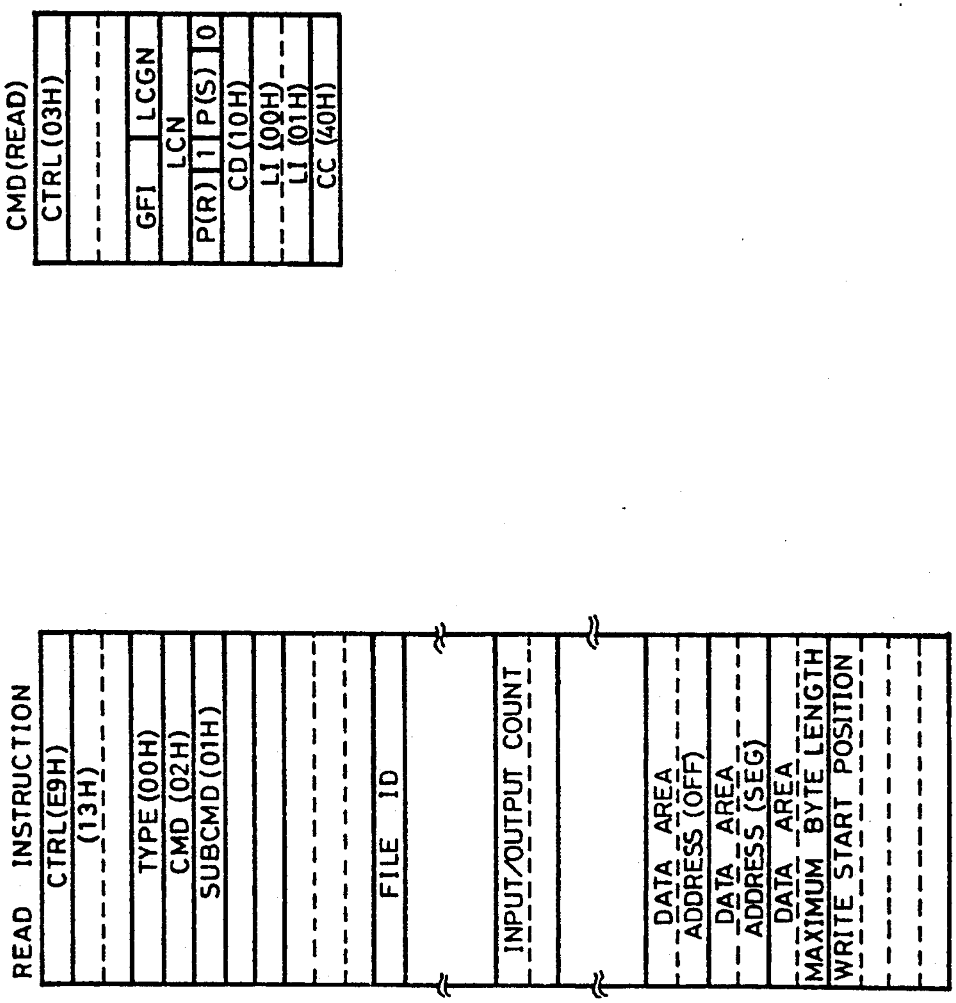
FIG.18(b) FILE READ <620>

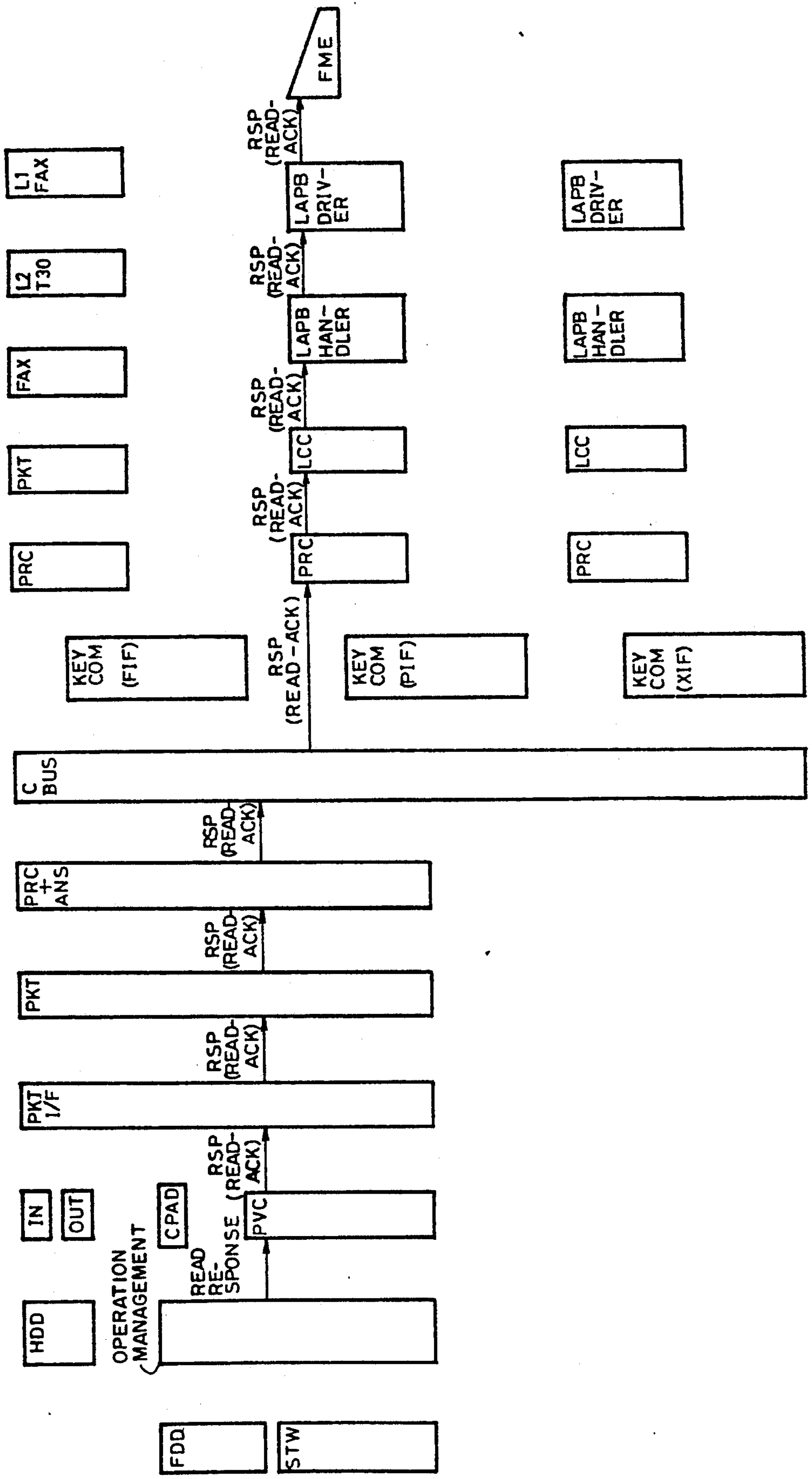
FIG. 19(a) FILE READ SUCCESS <621>

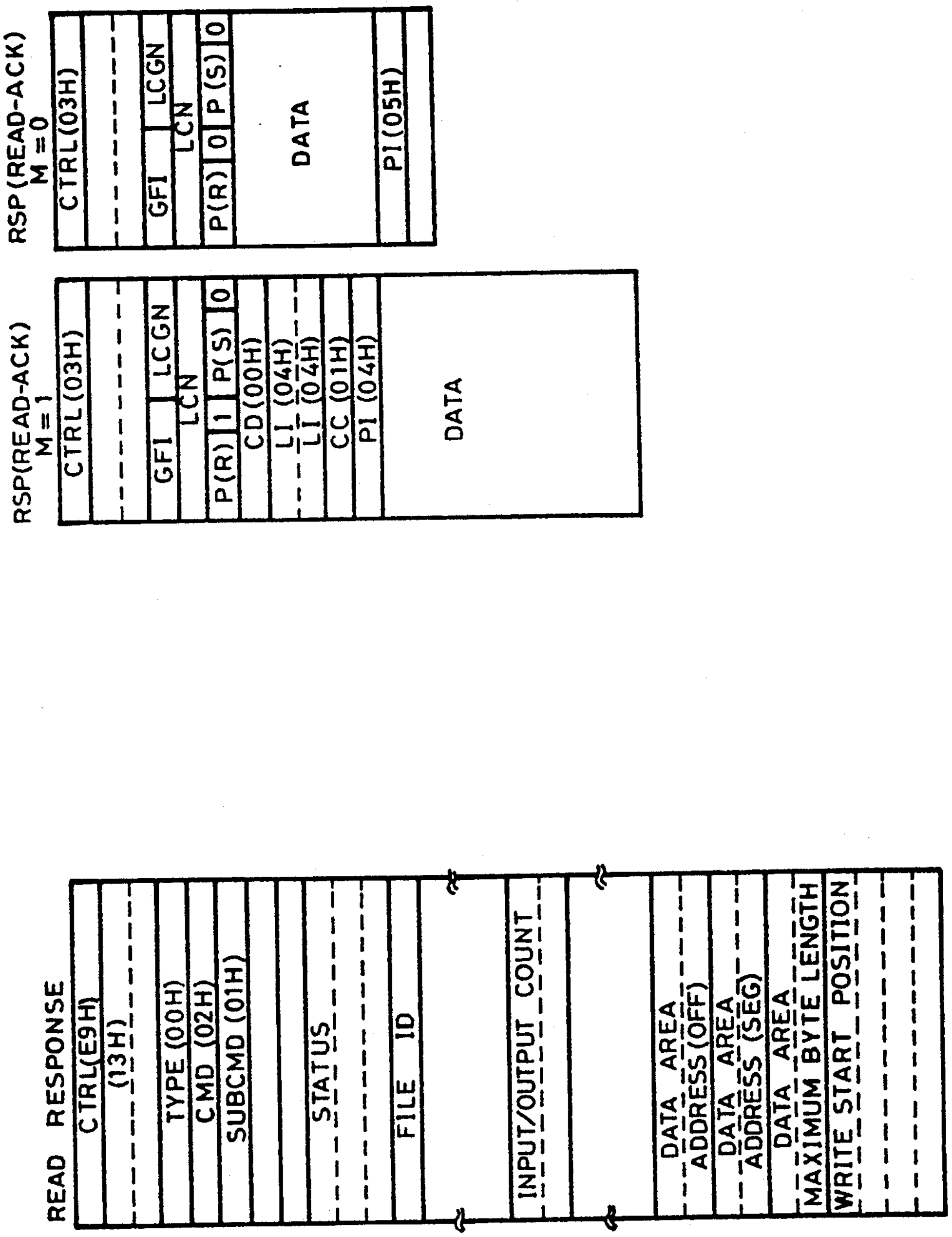
FIG.19(b) FILE READ SUCCESS <621>

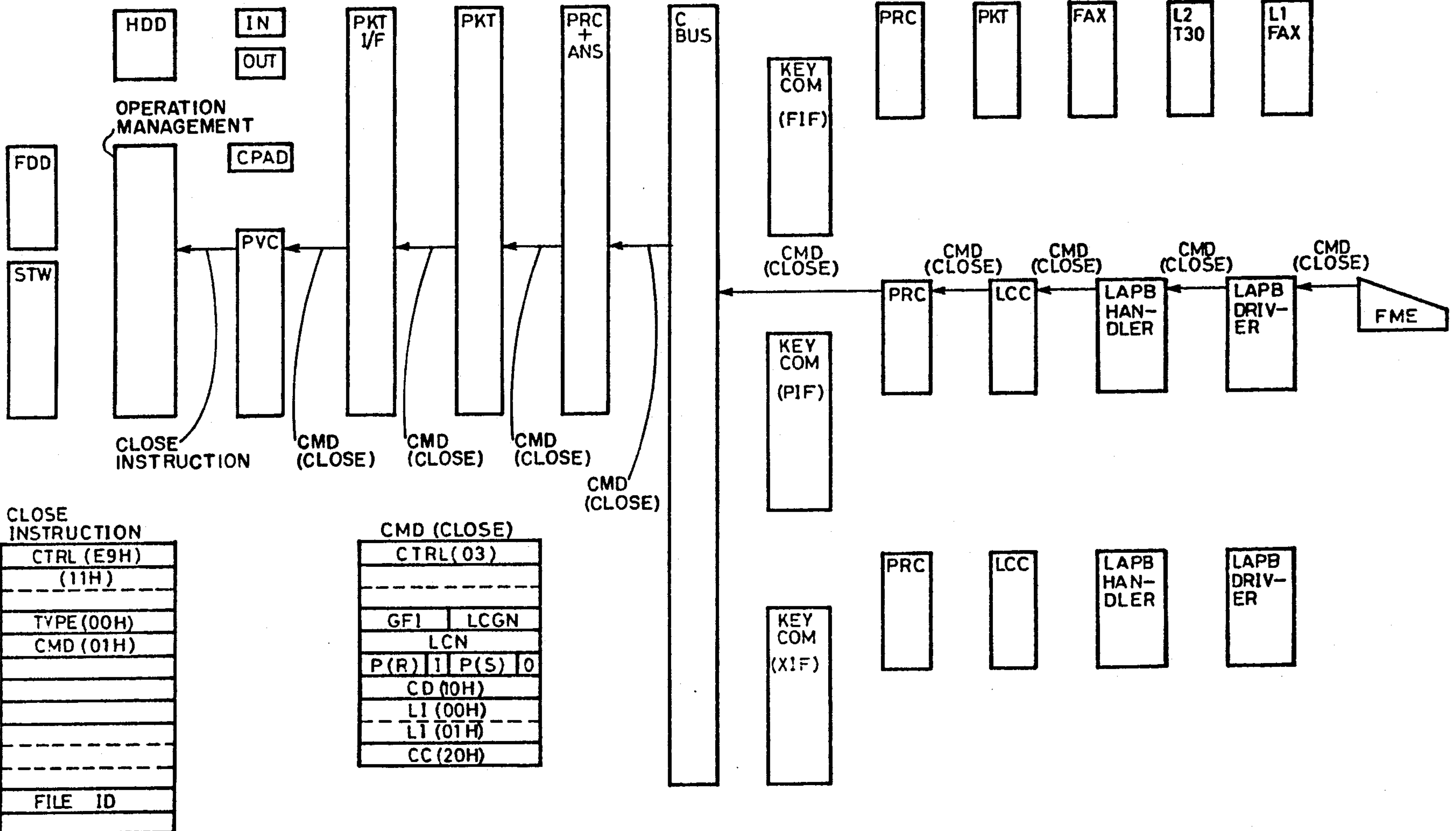
FIG. 20 FILE CLOSE <622>
HDD
IN
OUT
PKT I/F
PKT
PRC + ANS
C BUS
KEY COM (FIF)
PRC
PKT
FAX
L2 T30
L1 FAX
OPERATION MANAGEMENT
CPAD
FDD
STW
PVC
CMD (CLOSE)
PRC
LCC
LAPB HAN-DLER
LAPB DRIV-ER
FME
KEY COM (PIF)
CLOSE INSTRUCTION
KEY COM (XIF)
CLOSE INSTRUCTION
CTRL (E9H)
(11H)
TYPE (00H)
CMD (01H)
FILE ID
CMD (CLOSE)
CTRL (03)
GFI
LCGN
LCN
P(R) I P(S) 0
CD (10H)
LI (00H)
LI (01H)
CC (20H)

11 ~ 1n;FACSIMILE TERMINAL UNIT

FACSIMILE TERMINAL CONCENTRATION EQUIPMENT AND REMOTE OPERATION CONTROL SYSTEM THEREFOR

BACKGROUND OF THE INVENTION

1. Field of the Invention

The present invention relates to a facsimile terminal concentration equipment and a remote operation control system therefor in facsimile communication systems.

2. Description of the Prior Art

FIG. 21 is a block diagram showing an arrangement of a principal portion of such a type of facsimile communication system. In FIG. 21, 11 to 1*n* represents terminal units such as G3FAX (Group 3 Facsimile Apparatus for transmitting and receiving a facsimile message (or telegram), and 2 designates a facsimile mail equipment (FME) for the transmission and reception of packet data of the facsimile message which further has various user service functions. Further, illustrated at 3 is a facsimile terminal concentration equipment (FCE) for establishing communications with the plurality of facsimile terminal units 11 to 1*n* to temporarily store in a fixed disk a facsimile message transmitted from the operated facsimile terminal unit and to then convert it into packet data to transmit the converted packet data to the facsimile mail equipment 2 and further for temporarily storing in the fixed disk packet data transmitted from the facsimile mail equipment 2 and then converting it into a facsimile message to transmit the converted facsimile message to the addressed facsimile terminal unit. Numeral 4 is a telephone network or PBX for establishing the communications between the facsimile terminal units 11 to 1*n* and the facsimile terminal concentration equipment 3, and 5 depicts a packet network for establishing the communications between the facsimile terminal concentration equipment 3 and the facsimile mail equipment 2.

Secondly, a description will be made hereinbelow in terms of the operation. The facsimile terminal concentration equipment 3 temporarily stores a facsimile message transmitted from the facsimile terminal unit 11, for example, in a fixed disk and then converts it into packet data to transmit the packet data to facsimile mail equipment 2. Further, the facsimile terminal concentration equipment 3 temporarily stores packet data (facsimile message packeted) transmitted from the facsimile mail equipment 2 in the fixed disk and then converts it into a facsimile message to transmit the converted facsimile message to the facsimile terminal unit 1*n*, for example. Between the facsimile terminal concentration equipment 3 and the facsimile mail equipment 2 there is always established a virtual call (call due to the communication code) which is arranged so as not to be disconnected in normal conditions. In case of the disconnection of this virtual call, a trouble monitoring function of the facsimile mail equipment 2 regards the facsimile terminal concentration equipment 3 or a packet network 5 as being in a fault state.

Here, the conventional facsimile terminal concentration equipment 3 to be used in such a facsimile communication system is not arranged to be remotely controllable through the facsimile mail equipment 2. Accordingly, in the case of change of the network data of the facsimile terminal concentration equipment 3, change of the load module, supply of various commands and others, it is required to supply the various commands through a control terminal unit (not shown) which is directly coupled to the facsimile terminal concentration equipment 3 and to change the load module and others through a floppy disk driver provided in the equipment 3. Thus, there is a problem that, in the case that the facsimile terminal concentration equipment 3 is placed remotely from the facsimile mail equipment 2, for performing the various operations, the operator is required to go to the installation place of the facsimile terminal concentration equipment 3.

SUMMARY OF THE INVENTION

It is therefore an object of the present invention to eliminate the aforementioned problem and contemplates to provide a facsimile terminal concentration equipment and a remote operation control system therefor which allows the direct remote operation control of the facsimile terminal concentration equipment from the facsimile mail equipment and further permits notification of the information of various troubles, which can occur in the facsimile terminal concentration equipment, to the facsimile mail equipment.

A facsimile terminal concentration equipment according to the present invention is coupled to a plurality of facsimile terminal units for the transmission and reception of facsimile messages through a telephone network or private conversion means and further coupled to a facsimile mail equipment which performs the transmission and reception of packet data of facsimile messages through a packet network and has various user service functions so as to execute the communications with the plurality of facsimile terminal units to temporarily store in a fixed disk the facsimile message from the operated facsimile terminal unit to then convert it into packet data and transmit the packet data to the facsimile mail equipment, and further to temporarily store in the fixed disk the packet data from the facsimile mail equipment to then convert the packet data into a facsimile message to transmit it to the addressed facsimile terminal unit, the facsimile terminal concentration equipment in addition comprising downline loading means for transferring various commands, various load modules, various files and others from the facsimile mail equipment to the facsimile terminal concentration equipment itself and upline loading means for transferring various commands, various load modules, various files and others to the facsimile mail equipment.

Furthermore, a remote operation control system according to this invention is arranged to perform the remote operation control from the facsimile mail equipment with respect to the facsimile terminal concentration equipment by using the aforementioned downline loading means and upline loading means.

The above and other objects, features, and advantages of the Invention will become more apparent from the following description when taken in conjunction with the accompanying drawings.

BRIEF DESCRIPTION OF THE DRAWINGS

FIGS. 7 to 20 are detailed illustrations of the aforementioned sequences.

DESCRIPTION OF THE PREFERRED EMBODIMENT

Figure 1:
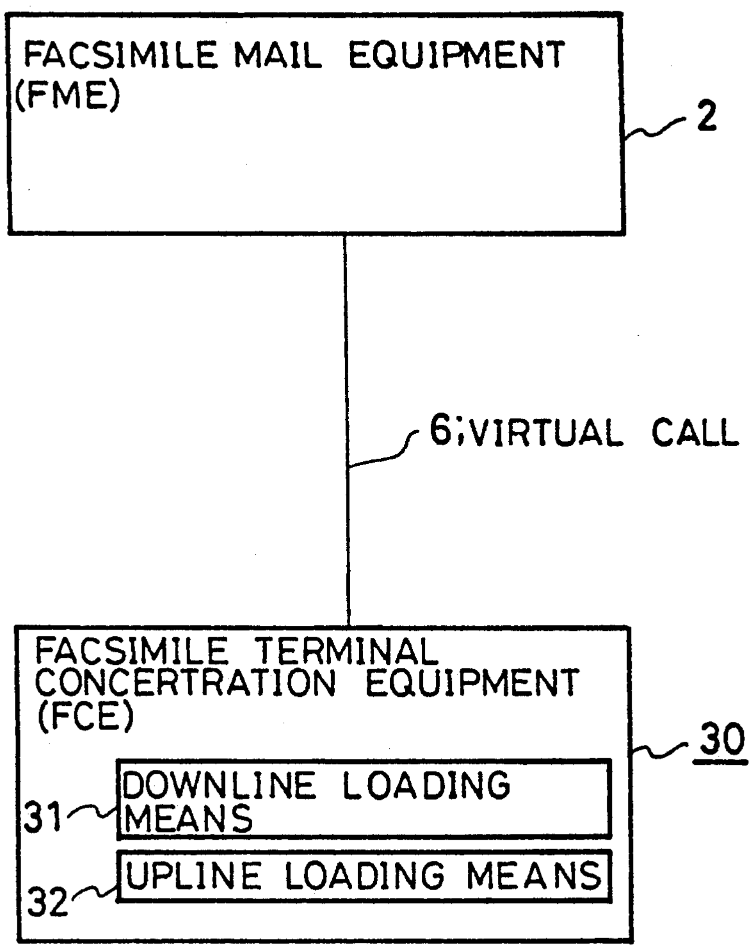
FIG. 1 is a block diagram showing an arrangement of a feature of a remote operation control system for a facsimile terminal concentration equipment according to an embodiment of the present invention.
Figure 21:
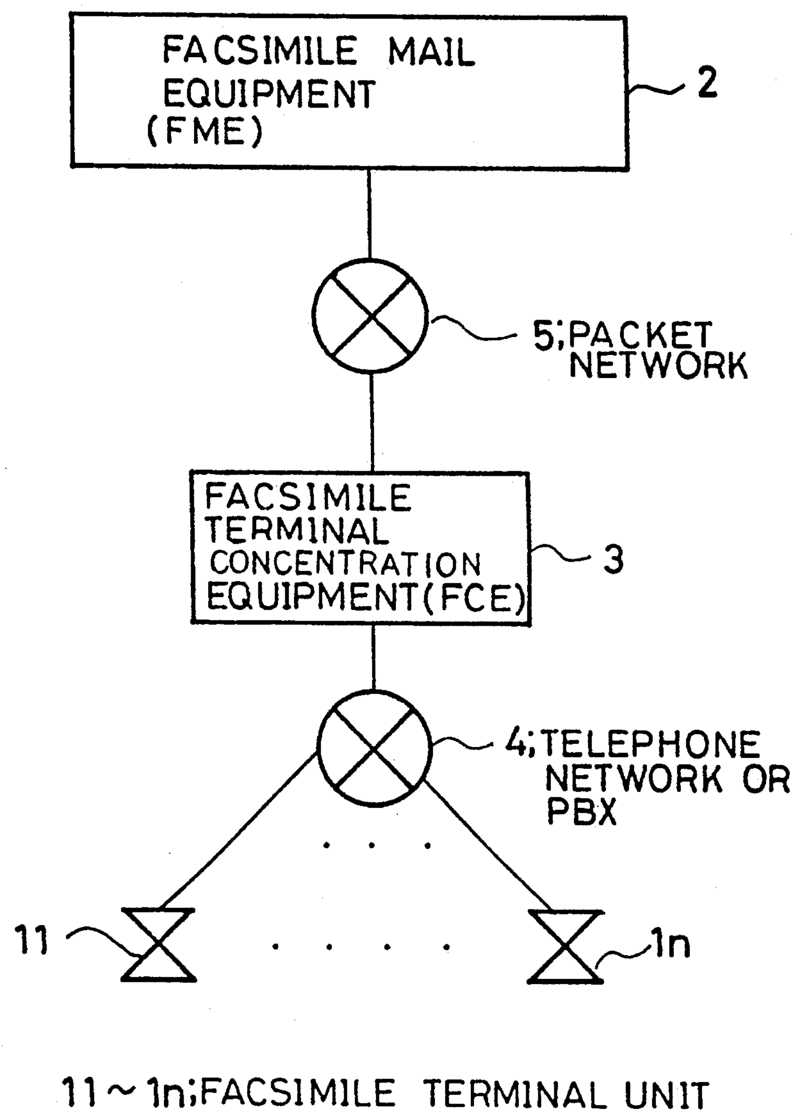
FIG. 21 is a block diagram showing an arrangement of a principal portion of one example of conventional facsimile communication systems.

An arrangement of a principal portion of a facsimile communication system for which a remote operation control system for a facsimile terminal concentration equipment according to an embodiment of the present invention is employed is similar to that of the conventional facsimile communication system illustrated in FIG. 21. FIG. 1 shows an arrangement of an feature of the remote operation control system of this embodiment. In FIG. 1, the facsimile terminal concentration equipment (which will be referred hereinafter to as FCE) 30 is equipped with a downline loading means 31 for transferring various commands, various load modules, various files and others to be supplied from a facsimile mail equipment (which will be referred hereinafter to as FME) 2 and further equipped with an upline loading means 32 for transferring various commands, various load modules, various files and others to the FME 2. Numeral 6 represents a virtual call established between the FME2 and the FCE 30 which is arranged so as not to be disconnected in the normal conditions.

Figure 2:
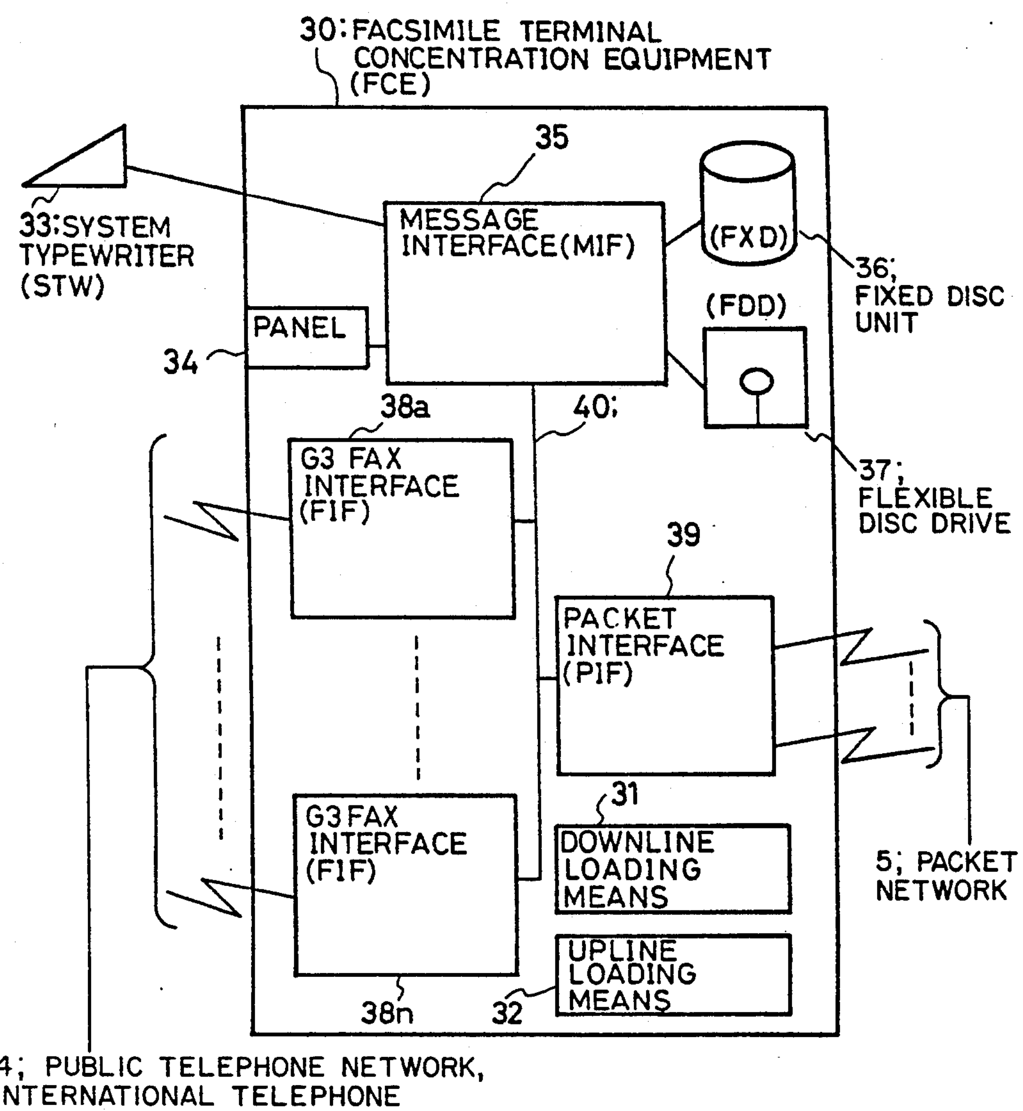
FIG. 2 is a block diagram showing an internal arrangement of a facsimile terminal concentration equipment according to an embodiment of this invention.

FIG. 2 is a block diagram showing an internal arrangement of the FCE 30. In the illustration, 33 depicts a system typewriter for performing the input and output of operation management commands through keys, 34 denotes a control panel for displaying the input and output of the aforementioned commands, 35 represents a message interface (which will be referred hereinafter to as MIF) for managing the accumulation and storage of the input/output facsimile messages, 36 designates a magnetic disc unit acting as a fixed disk to accumulate and store programs, messages and the like, 37 indicates a flexible disc unit for reading an initializing program and outputting an memory dump on occurrence of troubles, 38*a* to 38*n* are G3FAX interfaces (which will be referred hereinafter to as FIFs) for executing the T.30 process between the FCE 30 and, for example, G3FAX terminal units acting as the facsimile terminal units which FIFs are coupled through a telephone network or PBX (private conversion means) 4 to the G3FAX terminal units. Further, 39 represents a packet interface (which will be referred hereinafter to as PIF) for executing the X.25 process between the FCE 30 and a packet network 5, and 40 is a C bus for the connection of the above-mentioned messages, packet and FIFs.

Figure 3:
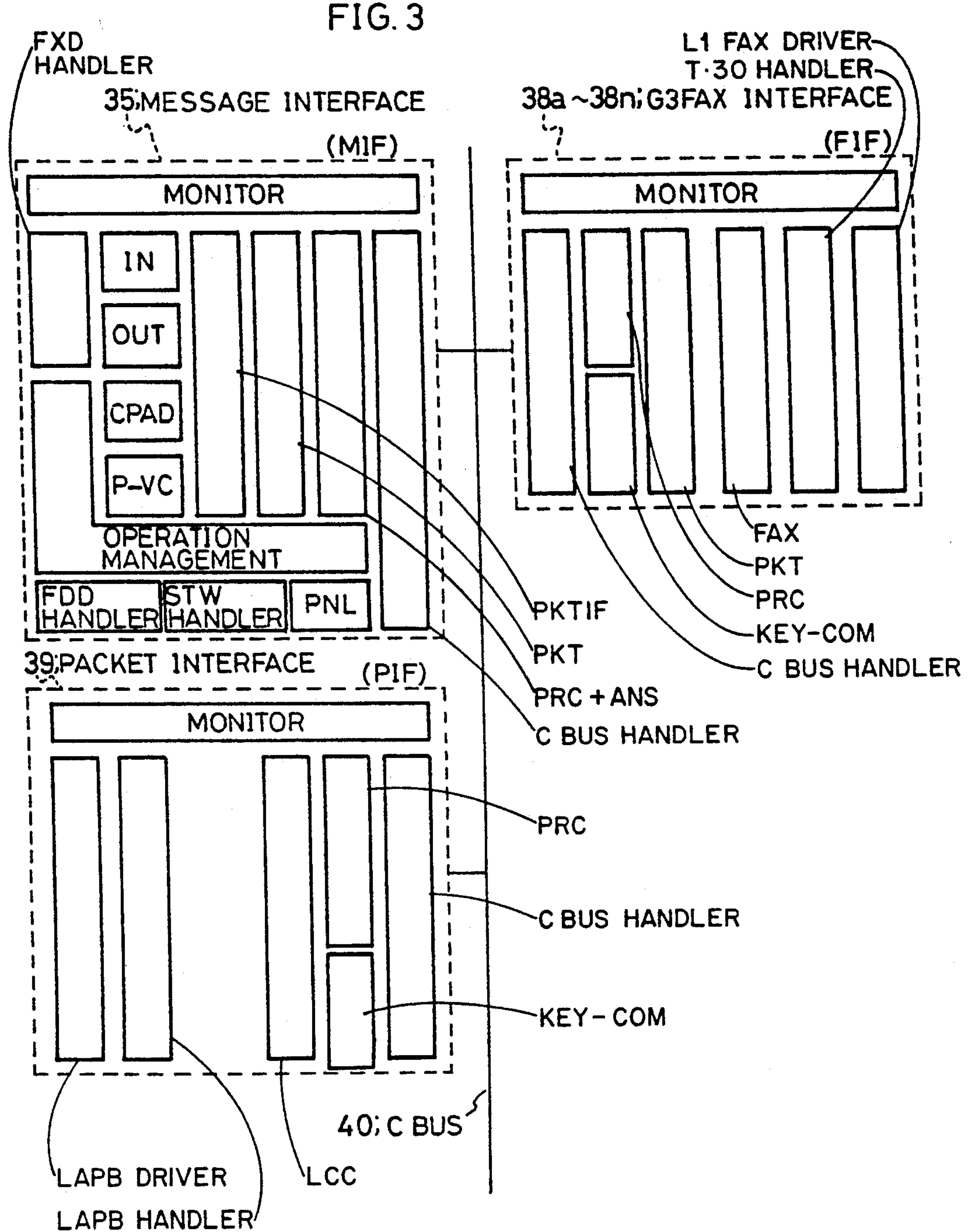
FIG. 3 is an illustration of task arrangements of portions in FIG. 2.

FIG. 3 is an illustration of a task arrangement of a software for the FCE 30. A description will be made hereinbelow in terms of task processes, and will be first started from the common portion of the respective interfaces. In the illustration, a monitor has a switching function between the tasks, timer function and buffer managing function. A C-bus handler performs the transmission and reception of data to and from the C bus 40 to establish the communication with the respective control sections (MIF, PIF, FIF). A KEY-COM executes the operation managing packet and manages the status of the self-processing section. A PRC (Packet Routing Control) realizes the internal conversion network to perform the control of the X.25CALL. In the MIF section, a PRC+ANS (Answer Task) executes the PRC function to instruct the other processing section and the port in response to the arrive and depart call from the terminal unit or packet network. A PKT (Packet DTE) executes the control of the X.25DATA. A PKTIF (Packet DTE Interface) performs the switching operation at every host task call. An IN and OUT represent the message input tasks and message output task having the Cont-In, Out and Body-In, Out functions, respectively. Further, a CPAD (Character Packet Assembly and Disassembly) performs the data control function to a M-cont seat, a P-VC (Pilot VC) executes the data control function to the FME 2 and the managing function of the FME 2, and a FXD handler performs the reading and writing of data in the magnetic disc unit 36. The operation management includes the software loading to the respective communication control processing sections, status management and device management. Still further, A FDD handler performs the reading and writing of data of a FDD (floppy disk), a PNL (Control Panel) executes the data control function to function keys and ten-keys, and a STW handler represents the data control function to a character terminal unit to be connected in the RS-232C. In the FIF section, a PKT (Packet DTE) performs the control of the X.25DATA. A FAX performs the conversion from the T.30 procedure to the X.25 packet and the reverse conversion, a T.30 handler executes the T.30 procedure to the G3FAX terminal units, a L1.FAX driver performs the transmission and reception of data to the telephone network. In the PIF section, a LCC (Logical Channel Converter) is the gateway function between the internal conversion network and the packet conversion network. A LAPB handler executes the HDLC LAPB procedure to the packet conversion network, and a LAPB driver performs the transmission and reception of data to packet conversion network.

Figure 4:
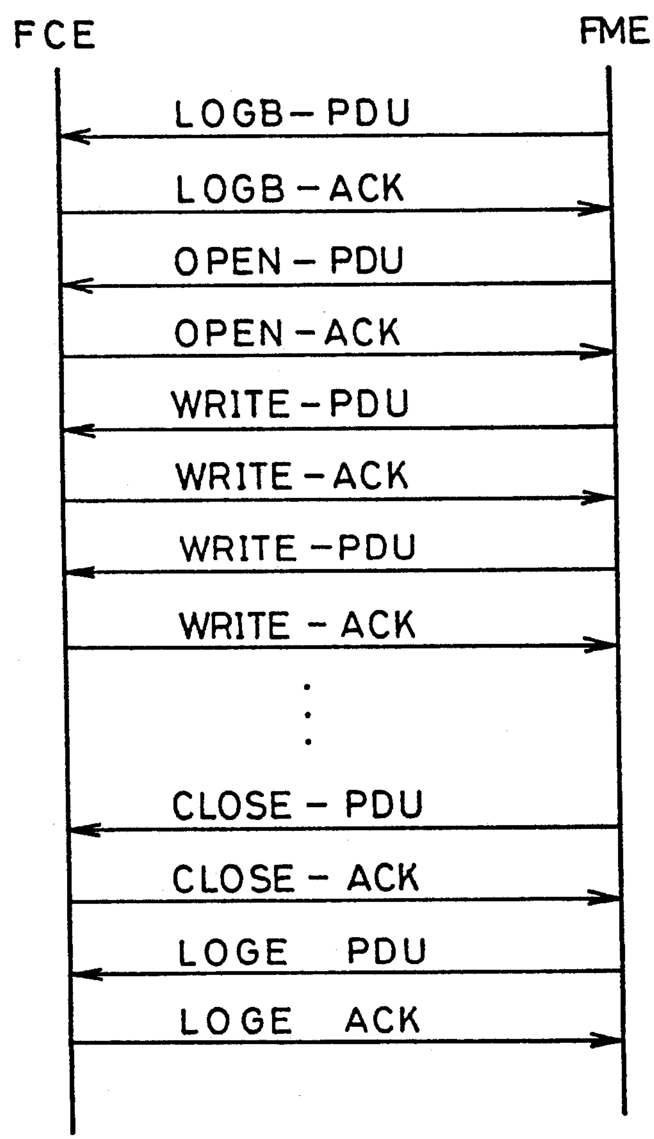
FIG. 4 is an illustration of a sequence of the downline loading of a file from a facsimile mail equipment to a facsimile terminal concentration equipment.
Figure 5:
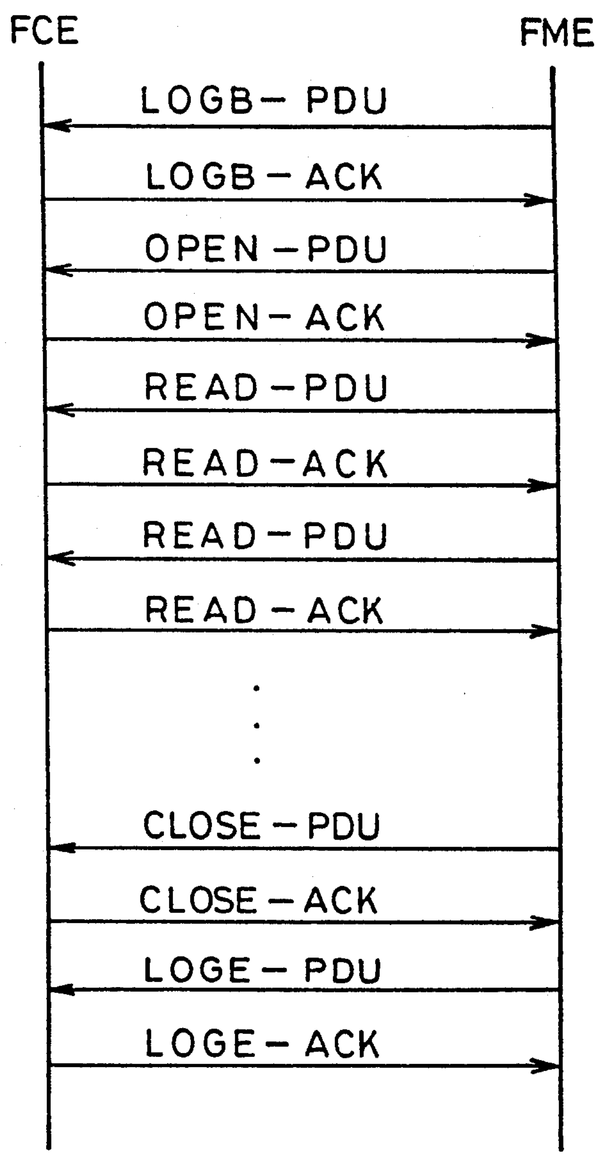
FIG. 5 is an illustration of a sequence of the upline loading of a file from the facsimile terminal concentration equipment to the facsimile mail equipment.
Figure 6:
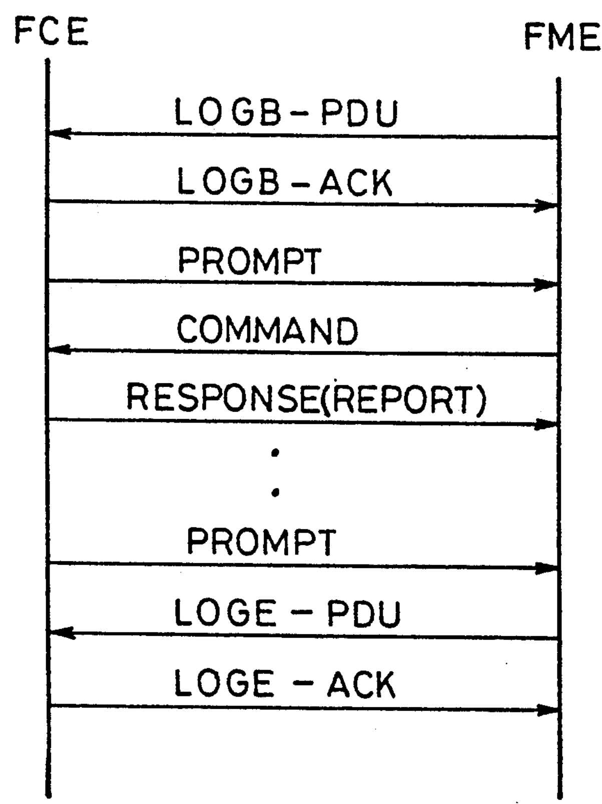
FIG. 6 is an illustration of a sequence of the downline loading of a command from the facsimile mail equipment to the facsimile terminal concentration equipment.
Figure 7:
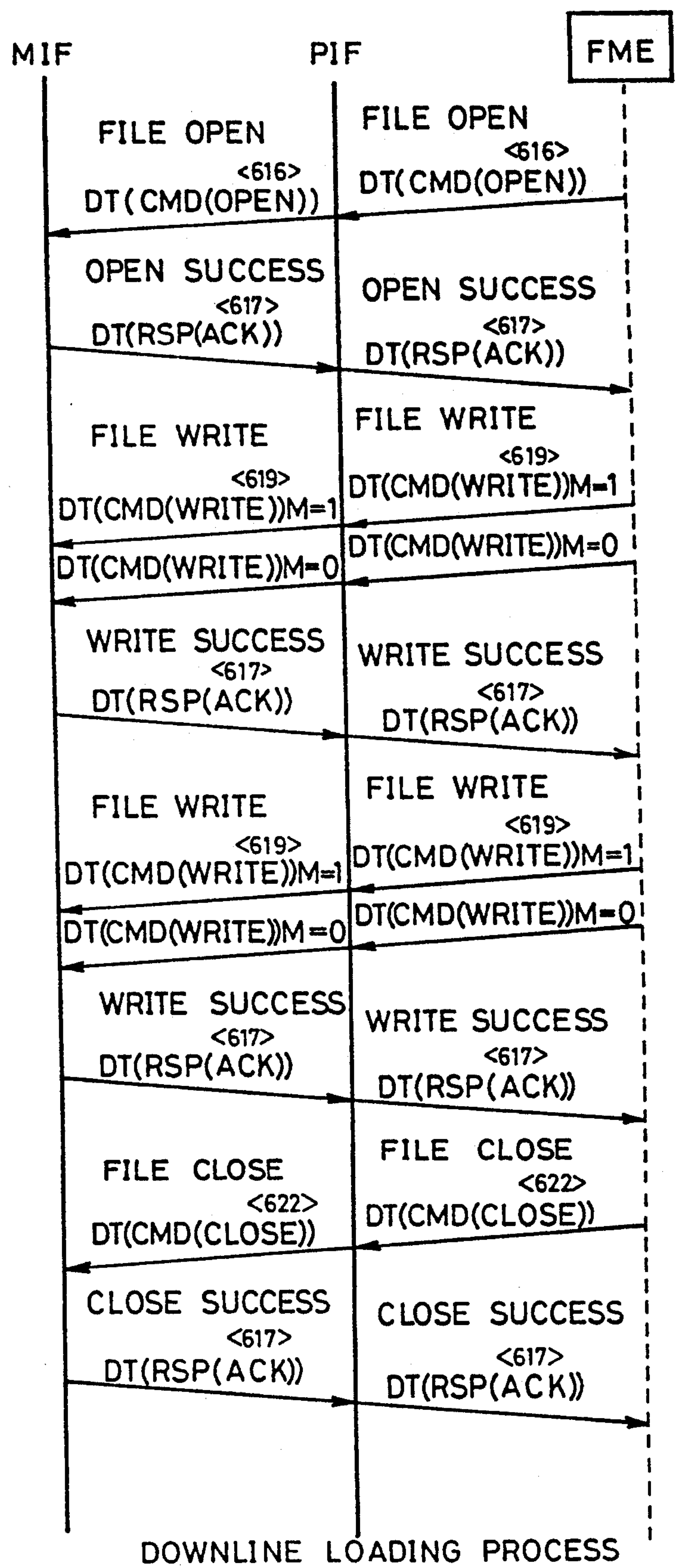
Figure 8:
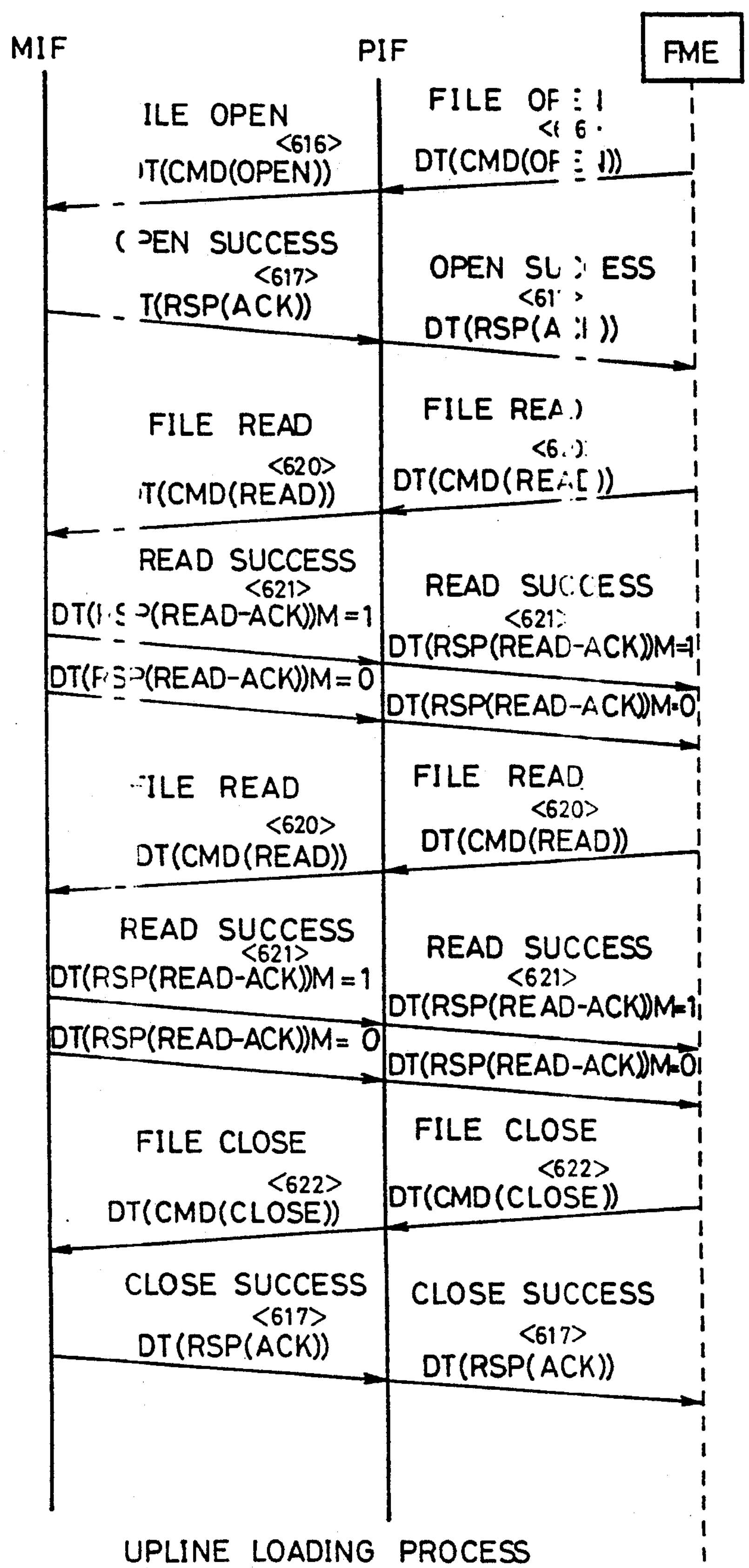
Figure 9:
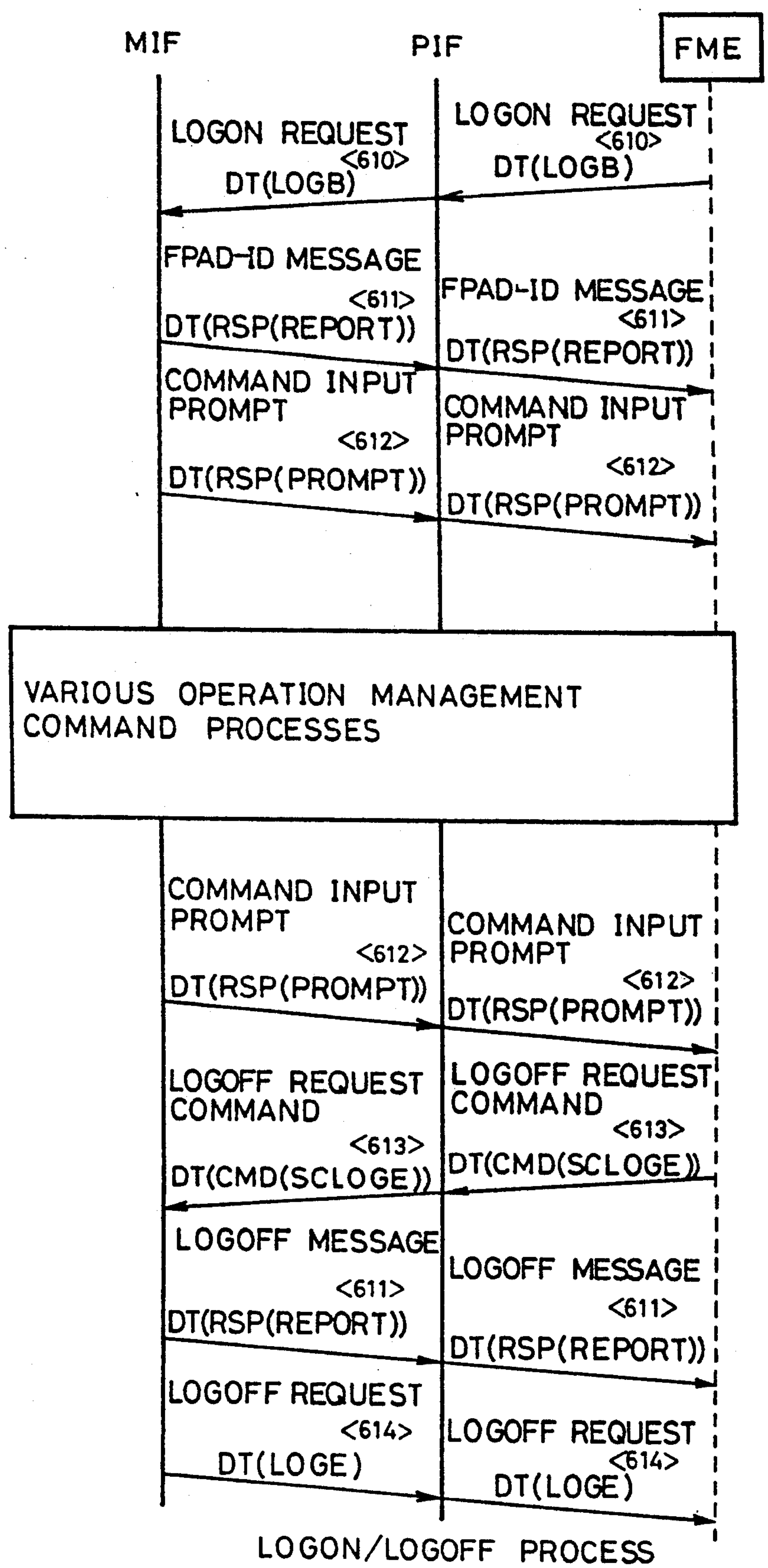

FIG. 4 is an illustration of the sequence of the downline loading of a file from the FME 2 to the FCE 30, FIG. 5 is an illustration of the sequence of the upline loading of a file from the FCE 30 to the FME 2, FIG. 6 is an illustration of the sequence of the downline loading of a command from the FME 2 to the FCE 30, FIGS. 7 to 9 are sequence illustrations for in detail describing the sequences shown in FIGS. 4 to 6, and FIGS. 10 to 20 are sequence illustrations for further detailed description of the sequences shown in FIGS. 7 to 9.

Secondly, a description will be made hereinbelow with reference to FIGS. 1 to 20 in terms of the operation of this embodiment. In the case of performing the downline loading of various commands, various load modules, various files and others from the FME 2 to the FCE 30, and in the case of effecting the upline loading of the aforementioned items from the FCE 30 to the FME 2, the data transfer is made by using the virtual call 6 established between the FME 2 and the FCE 30 so as to not to be disconnected in the normal conditions.

When performing the downline loading of a file from the FME 2 to the FCE 30 (see FIGS. 4 and 7), the FME 2 first obtains the allowance of the access with respect to the FCE 30 (LOGB-PDU, LOGB-ACK), before opening the file (OPEN-PDU, OPEN-ACK) to then perform the downline loading (WRITE-PDU, WRITE-ACK) of the file data so as to be stored in a fixed disk. After the completion of the downline loading of the file data, the file is closed (CLOSE-PDU, CLOSE-ACK) and the FME 2 then abandons the access right with respect to the FCE 30 (LOGE-PDU, LOGE-ACK).

In the case of carrying out the upline loading of a file from the FCE 30 to the FME 2 (see FIGS. 5 and 8), the FME 2 first obtains the allowance of the access with respect to the FCE 30 (LOGB-PDU, LOGB-ACK), before opening the file (OPEN-PDU, OPEN-ACK) to then do the upline loading of the file data so that the data stored in the fixed disk is outputted. In response to the completion of the upline loading of the file data, the file is closed (CLOSE-PDU, CLOSE-ACK) and the FME 2 then abandons the access right with respect to the FCE 30 (LOGE-PDU, LOGE-ACK). In the case of carrying out the downline loading of a command from the FCE 30 to the FME 2 (see FIGS. 6 and 9, logon/-logoff process), the FME 2 first obtains the allowance of the access with respect to the FCE 30 (LOGB-PDU, LOGE-ACK). Thereafter, when the FCE 30 enters into the command-receivable state (prompt), the command is supplied from the FME 2 to the FCE 30 and the response and report for the command is supplied from the FCE 30 to the FME 2. When the FME 2 completes the control according to the command from the FCE 30, the FME 2 abandons the access right to the FCE 30 (LOGE-PDU, LOGE-ACK). With the above-described process, the FME 2 can perform the remote operation control with respect to the FCE 30. Here, the sequence operations represented by the numbers in < > in FIGS. 7 to 9 respectively correspond to the detailed sequence operations shown in FIGS. 10 to 20 where the same numerals are illustrated in < > at the header portions.

As described above, according to the present invention, the facsimile terminal concentration equipment is provided with the downline loading means and the upline loading means. This provision allows the change of the load module of the facsimile terminal concentration equipment, the downline loading of a file from the facsimile mail equipment and the upline loading of a file to the facsimile mail equipment, whereby the facsimile mail equipment can perform the remote operation control of the facsimile terminal concentration equipment and, in addition, receives information relating to troubles which can occur in the facsimile terminal concentration equipment. Thus, it is possible to improve the maintenance and operational effectiveness in a facsimile communication system.

What is claimed is:

1. A facsimile terminal concentration equipment having remote operation control and fault notification capability for use with a plurality of facsimile terminal units having means for transmitting and receiving facsimile messages, and with a remote facsimile mail equipment having means for transmitting and receiving packet data of facsimile messages through a packet network, said facsimile terminal concentration equipment comprising:

a memory;

means for communicating with said plurality of facsimile terminal units, storing temporarily in said memory a first facsimile message from a facsimile terminal unit, converting said first facsimile message into packet data, and transmitting said packet data to said facsimile mail equipment;

means for storing temporarily in said memory a second packet data from said facsimile mail equipment, converting said second packet data into a facsimile message, and transmitting said facsimile message to a facsimile terminal unit;

downline loading means for supporting remote operation control and fault handling at a system operator level by transferring commands, load modules, and files other than said packet data from said facsimile mail equipment; and upline loading means for supporting remote operation control and fault handling at a system operator level by transferring commands, load modules, and files other than said packet data to said facsimile mail equipment.

2. A facsimile terminal concentration equipment as claimed in claim 1, wherein said memory includes a fixed disk for storing programs, and wherein said facsimile terminal concentration equipment further comprises a system typewriter for performing input and output of operation management commands through keys, a control panel for displaying the input and output of said commands, a message interface for managing storage of input and output facsimile messages, a flexible disc unit for reading an initializing program and for outputting a memory dump at the time of occurrence of troubles, interface means for executing a T.30 process with external G3FAX terminal units, packet interface means for executing an X.25 process with an external packet network, and a C-bus connecting said message interface, said packet interface and said G3FAX interface.

3. A remote operation control system comprising:

a facsimile terminal concentration equipment;

a plurality of facsimile terminal units, connected to said facsimile terminal concentration equipment, and having means for transmitting and receiving facsimile messages; and a facsimile mail equipment remotely located with respect to said facsimile terminal concentration equipment, connected via a data channel to said facsimile terminal concentration equipment, and having means for transmitting and receiving packet data of facsimile messages through a packet network;

wherein said facsimile terminal concentration equipment includes a memory, first means for communicating with said plurality of facsimile terminal units, storing temporarily in said memory a first facsimile message from a facsimile terminal unit, converting said first facsimile message into a first packet data, and transmitting said first packet data to said facsimile mail equipment, and second means for storing temporarily in said memory a second packet data from said facsimile mail equipment, converting said second packet data into a second facsimile message, and transmitting said second facsimile message to a facsimile terminal unit; and wherein said facsimile terminal concentration equipment includes downline loading means for transferring commands, load modules, and files other than said packet data from said facsimile mail equipment and, upline loading means for transferring commands, load modules, and files other than said packet data to said facsimile mail equipment;

whereby a remote operation control from said facsimile mail equipment to said facsimile terminal concentration equipment may be executed through said downline loading means and said upline loading means.

4. A facsimile terminal concentration equipment having remote operation control and fault notification capability for use with a plurality of facsimile terminal units having means for transmitting and receiving facsimile messages, and with a remote facsimile mail equipment having means for transmitting and receiving packet data of facsimile messages through a packet network, said facsimile terminal concentration equipment comprising:

a memory;

means for communicating with said plurality of facsimile terminal units, storing temporarily in said memory a first facsimile message from a facsimile terminal unit, and converting said first facsimile message into packet data;

means for transmitting said packet data to said facsimile mail equipment;

means for storing temporarily in said memory a second packet data from said facsimile mail equipment, and converting said second packet data into a facsimile message;

means for transmitting said facsimile message to a facsimile terminal unit; and upline loading means for supporting remote operation control at a system level by transferring commands other than said packet data to said facsimile mail equipment.

5. A facsimile terminal concentration equipment as claimed in claim 4, wherein said upline loading means includes means for supporting remote operation control at a system level by transferring files other than said packet data to said facsimile mail equipment.

6. A facsimile terminal concentration equipment as claimed in claim 5, wherein said upline loading means further includes means for supporting remote operation control at a system level by transferring load modules to said facsimile mail equipment.

7. A facsimile terminal concentration equipment as claimed in claim 4, further comprising downline loading means for supporting remote operation control at a system level by transferring operation management commands from said facsimile equipment, wherein said downline loading means includes means for supporting remote operation control at a system level by transferring commands other than said packet data to said facsimile mail equipment.

8. A facsimile terminal concentration equipment as claimed in claim 7, wherein said upline loading means further includes means for supporting remote operation control at a system level by transferring files to said facsimile equipment and said downline loading means further includes means for supporting remote operation control at a system level by transferring files other than said packet data from said facsimile mail equipment.

9. A remote operation control system comprising:

a facsimile terminal concentration equipment;

a plurality of facsimile terminal units, connected to said facsimile terminal concentration equipment, and having means for transmitting and receiving facsimile messages; and a facsimile mail equipment remotely located with respect to said facsimile terminal concentration equipment, connected via a data channel to said facsimile terminal concentration equipment, and having means for transmitting and receiving packet data of facsimile messages through a packet network;

wherein said facsimile terminal concentration equipment includes a memory, first means for communicating with said plurality of facsimile terminal units, storing temporarily in said memory a first facsimile message from a facsimile terminal unit, and converting said first facsimile message into a first packet data, means for transmitting said first packet data to said facsimile mail equipment, second means for storing temporarily in said memory a second packet data from said facsimile mail equipment, and converting said second packet data into a second facsimile message, and means for transmitting said second facsimile message to a facsimile terminal unit; and wherein said facsimile terminal concentration equipment includes upline loading means for supporting remote operation control at a system level by transferring commands other than said packet data to said facsimile mail equipment.

10. A remote operation control system as claimed in claim 9, wherein said upline loading means includes means for supporting remote operation control at a system level by transferring files other than said packet data to said facsimile mail equipment.

11. A remote operation control system as claimed in claim 10, wherein said upline loading means further includes means for supporting remote operation control at a system level by transferring load modules to said facsimile mail equipment.

12. A remote operation control system as claimed in claim 9, wherein said facsimile terminal concentration equipment further includes downline loading means for supporting remote operation control at a system level by transferring operation management commands from said facsimile mail equipment, and said downline loading means includes means for supporting remote operation control at a system level by transferring commands other than said packet data to said facsimile mail equipment.

13. A facsimile terminal concentration equipment as claimed in claim 12, wherein said upline loading means further includes means for supporting remote operation control at a system level by transferring files to said facsimile mail equipment and said downline loading means further includes means for supporting remote operation control at a system level by transferring files other than said packet data from said facsimile mail equipment.

14. A facsimile terminal concentration equipment having remote operation control and fault notification capability for use with a plurality of facsimile terminal units having means for transmitting and receiving facsimile messages, and with a remote facsimile mail equipment having means for transmitting and receiving packet data of facsimile messages through a packet network, said facsimile terminal concentration equipment comprising:

a memory for storing programs and messages;

a message interface, connected to said memory, for managing storage of incoming and outgoing facsimile messages;

a system typewriter, connected to said message interface, for performing input and output of operation management commands through keys;

a control panel, connected to said message interface, for displaying input and output of said commands;

a removable memory, connected to said message interface, for reading an initializing program, and for outputting a memory dump for failure analysis;

a bus connected to said message interface;

interface means, connected to said bus, for executing a T.30 process with external G3FAX terminal units;

packet interface means, connected to said bus, for executing an X.25 process with an external packet network;

downline loading means, in data communication with said message interface, for supporting remote operation control at a system level by transferring commands, load modules, and files other than said packet data from said facsimile mail equipment; and upline loading means, in data communication with said message interface, for supporting remote operation control at a system level by transferring commands, load modules, and files other than said packet data to said facsimile mail equipment.

* * * * *